April 30, 1940.   W. SCHIMMEL   2,199,211
MINIATURE PIANO
Filed Jan. 7, 1937   9 Sheets-Sheet 1

Inventor:
Wilhelm Schimmel
by Hammond & Littell

April 30, 1940.  W. SCHIMMEL  2,199,211
MINIATURE PIANO
Filed Jan. 7, 1937  9 Sheets-Sheet 3

Inventor:
Wilhelm Schimmel
by Hammond & Littell

April 30, 1940.                W. SCHIMMEL                2,199,211
                              MINIATURE PIANO
                           Filed Jan. 7, 1937            9 Sheets-Sheet 4

Inventor:
Wilhelm Schimmel
by Hammond & Littell

April 30, 1940.  W. SCHIMMEL  2,199,211
MINIATURE PIANO
Filed Jan. 7, 1937  9 Sheets-Sheet 6

Inventor:
Wilhelm Schimmel
by Hammond & Littell

April 30, 1940.　　　W. SCHIMMEL　　　2,199,211
MINIATURE PIANO
Filed Jan. 7, 1937　　　9 Sheets-Sheet 7

Inventor:
Wilhelm Schimmel

April 30, 1940.　　　　W. SCHIMMEL　　　　2,199,211
MINIATURE PIANO
Filed Jan. 7, 1937　　　9 Sheets-Sheet 9

Inventor:
Wilhelm Schimmel
by Hammond & Littell

Patented Apr. 30, 1940

2,199,211

UNITED STATES PATENT OFFICE 2,199,211

MINIATURE PIANO

Wilhelm Schimmel, Brunswick, Germany, assignor of forty per cent to Max Wronker Flatow, London, England Application January 7, 1937, Serial No. 119,380
In Germany January 7, 1936

1 Claim. (Cl. 84—174)

This invention relates to miniature upright and grand pianos. The object of the invention is to provide instruments of the kind referred to the sounding properties of which are equivalent to those of the usual instruments of considerably greater size. Miniature pianos of different construction are already in use, but in these instruments, as hitherto known, the sound volume, i. e., the intensity of the sounds falls considerably short of that of a normal piano. For this reason up to date the miniature pianos cannot be considered as equivalent substitutes for the old-sized instruments.

The term "old size" means upright pianos 4⅓ feet high or grand pianos 5⅔ feet long, both instruments comprising fully 7 octaves from A to A. When the instruments according to the invention are said to have equivalent sounding properties, this means that also these smaller instruments comprise fully 7 octaves from A to A.

Part of the well-known miniature pianos which, as above explained, have not the same properties as the instruments of the old form, also comprise 7 octaves, but not from A to A but perhaps from C to C. This proves that with the old constructions of these small instruments one could not find space for bass strings of the same length as the bass strings in a common-sized instrument. This explains why the miniature pianos hitherto used were considerably weaker in sound than the above-mentioned normal instruments.

In a miniature upright piano according to this invention a stringed frame is provided in the well-known manner, and a sound intensity equal to that of a normal piano is obtained by putting in bass strings having the same or nearly the same length as in a normally sized instrument, and by making the hammers touch the strings in an angular (broken) line. In a miniature "grand" piano the same means are employed the grand piano jutting out to the greatest extent on the right side rearwards, and being tapered towards the left-hand side.

A miniature piano constructed according to my invention, when provided with bass strings of the same length as a piano about 4⅓ feet high, is not higher than about 3 feet. The length of the new grand piano is no more than 3 feet 10 inches, the bass strings having the same length as those hitherto used in a grand piano about 6 feet long.

The height of the miniature upright piano or the length of the miniature grand piano may be, if desired, further reduced and even longer bass strings may be employed by offsetting the broken part of the line touched by the hammers from the unbroken part thereof. Likewise it is possible to displace the longest strings from the middle section of the stringed frame to the bass section, so that in the middle section only relatively short strings are placed.

I am aware that in the so-called square pianos the line touched by the hammers has the form of a bow or angle. Hereby the advantage (which could not be attained before) is that uniformly shaped action elements can be employed as in a grand piano, whereby a good "repetition" is obtained nearly in the same manner as in grand pianos which repetition formerly caused great difficulties in connection with instruments of this kind. But also the well-known square pianos if equipped in the manner described cannot compete with the normal instruments as to tonic quality and, more especially, as to sound-intensity, for hitherto it was impossible to procure a square piano comprising seven full octaves from A to A. By the angular touching line provided in these instruments hitherto merely a simplification of the action was attained without improving the sound qualities as is the case in an instrument constructed according to applicant's invention.

The invention will now be more fully described with reference to the annexed drawings of which.

Figure 1:
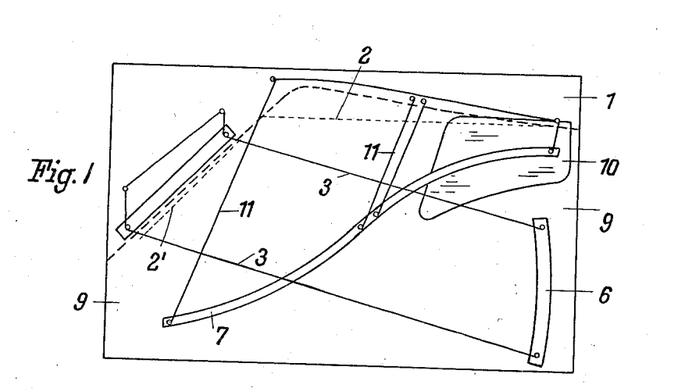
Fig. 1 is a diagrammatic front view of the stringed iron frame of a miniature upright piano constructed according to the invention. This instrument has a height, for instance, of 3 feet 2 inches, and the longest bass string has a length of 3 feet 9 inches. It comprises seven full octaves from A to A.
Figure 2:
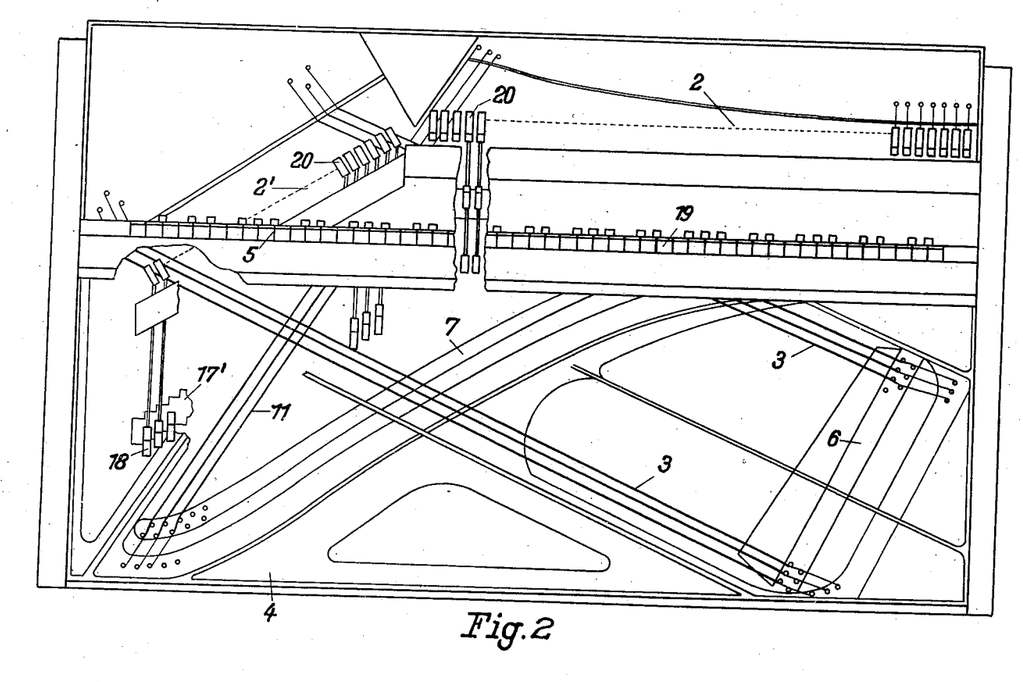
Fig. 2 shows a front elevation of my new miniature upright piano.

The minature upright piano according to the invention is (see especially Fig. 2) constructed in such a manner that the iron frame 4 is mounted behind the keyboard 5. The frame 4 is provided, beside the well-known stiffening ribs, with the bass-web 6 and the treble web 7. In a normal upright piano having the old form the line 2 touched by the hammers is a straight line passing below the tuning bar 1. This mounting offered no difficulty, as in an instrument having a height of 4⅓ feet sufficient space is available for the long bass strings which are about 3 feet 8 inches long. In my new miniature upright piano (see Fig. 1) bass strings 3 of the same length as in a normal instrument are inserted, an angular or broken touching line 2, 2' (which is known per se) being employed. Although in this case likewise bass strings as long as 3 feet 8 inches are used, the height of the instrument is reduced to 3 feet 2 inches. Furthermore in my new miniature upright piano, as shown in Figs. 1 and 2 the longest strings are displaced from the middle section to the bass-section, so that the treble web 7 can be made shorter (see the diagram Fig. 1). By this displacement of the longer bass strings the hitherto required bass disconnections, which are not filled out in a normal instrument by the sounding-board, are done away with.

The strings are attached to the webs or the iron frame by well-known means. The keyboard of the new instrument is carried out in the normal way. As shown in Fig. 2, this miniature upright piano comprises 7 full octaves from A to A. The strings of an intermediary length which are arranged in the middle section and the short treble strings are designated by 11.

Figure 3:
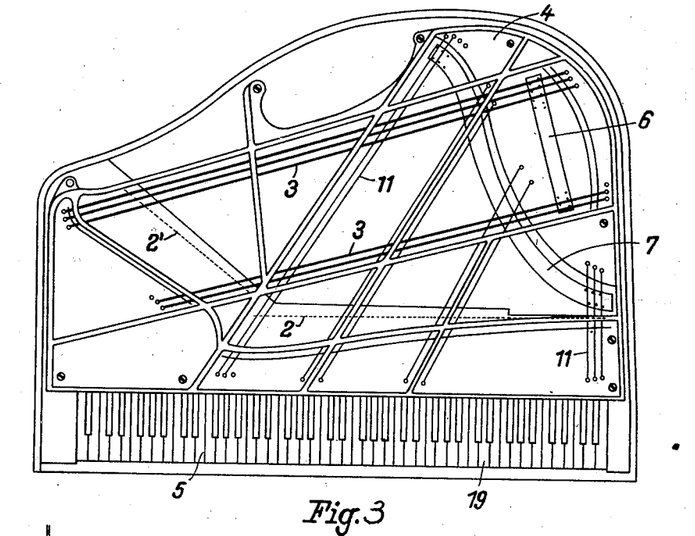
Fig. 3 is a plan view of a small grand piano constructed according to the invention, the instrument comprising 7 full octaves and its length being, for instance, 3 feet 10 inches. The bass strings have the same length as those hitherto used in a grand piano having a length of about 6 feet.

Fig. 3 shows a miniature "grand" piano constructed according to the invention in which likewise (as in the miniature upright) base strings 3 are inserted having the same or nearly the same length as those in a 6 feet long grand piano, a broken touching line 2, 2' being employed. These strings are attached to an iron frame which is mounted behind the keyboard 5 of the instrument, and on the other hand are attached to the bass web 6, whereas the intermediate and treble strings 11 are attached to the iron frame in the well-known manner.

In this small "grand" piano the long treble strings which hitherto were disposed in the middle section are placed in the bass section. This displacement of the strings, especially the long bass strings, and the possibility of employing bass strings equal in length to those in a normally sized grand piano whilst reducing the length of the instrument to 3 feet 10 inches as compared with a grand piano 6 feet in length, are obtained by making the grand piano jut out at the right-hand side rearwards whilst tapering the instrument at the left hand side.

This instrument comprises like a normal grand piano 7 octaves from A to A, as seen by the keyboard shown in Fig. 3. The broken touching line 2, 2' (Fig. 3) is formed in such a manner that the oblique part 2' has been offset rearwards from the part 2 which is parallel to the keyboard. Hereby the bass strings can be arranged at a still more acute angle to the keyboard whereby the length of the instrument is further reduced and even still longer bass strings can be used if desired. Furthermore by offsetting the part 2' of the touching line I have the possibility of locating and arranging the different parts of the elements of the action more conveniently just at the point where the touching line is broken.

Figure 4:
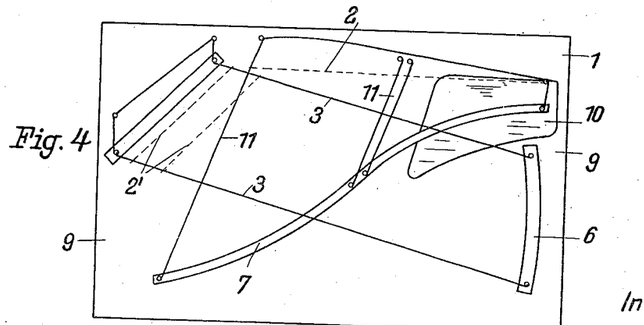
Fig. 4 is a diagrammatic front view of the stringed iron frame of a miniature upright piano performed in accordance with my invention, the broken part of the touching line being offset from its unbroken part, viz. from top to bottom.

Correspondingly in the miniature upright piano the angular part 2' of the touching line may be disposed in an offset position relative to the horizontal part 2 of this line. Such a disposition of the touching line is diagrammatically shown in Fig. 4. Also in connection with this miniature upright piano the advantages attributed above to the small "grand" piano are obtained, irrespective of the touching line 2' being offset upwards or downwards.

Figure 5:
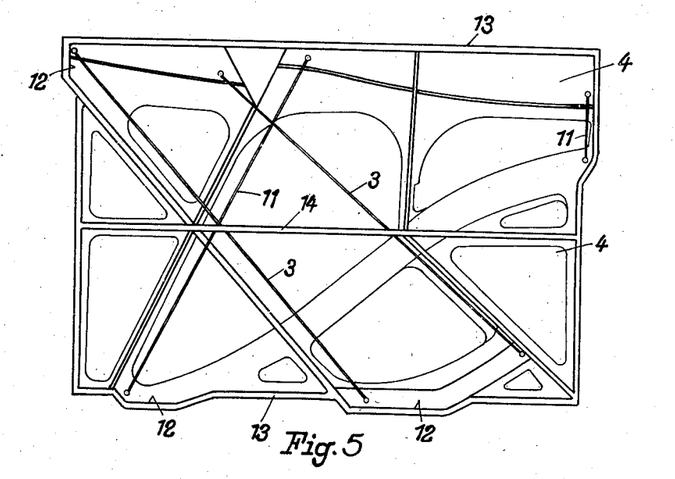
Fig. 5 shows in front elevation the iron frame provided with extensions.
Figure 6:
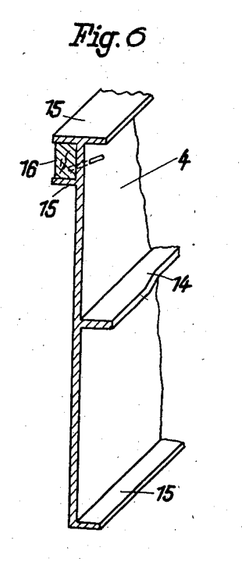
Figs. 6 and 7 are perspective detail views showing the iron frame provided with high-profiled projections and the method of mounting the tuning-bar in the iron frame.
Figure 7:
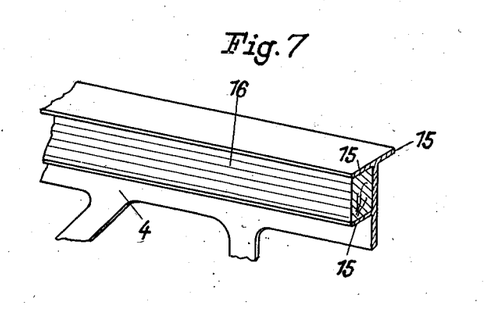

The iron frame 4 provided with the strings 3 and 11 has at different points extensions 12 arranged in such a manner that in addition still longer bass strings can be disposed upon the frame. At the points where the extensions 12 are provided in the frame 4 the outer stays 13 of the frame 14 project over the sounding board 9 or over the normal outer contour of the frame 4.

By the above-mentioned formation of the iron frame 4 the latter is given a greater mechanical strength and especially a higher resistance to distortion, and any mechanically unfavorable bending moments are done away with or reduced to such an extent that they can practically be neglected.

Figure 8:
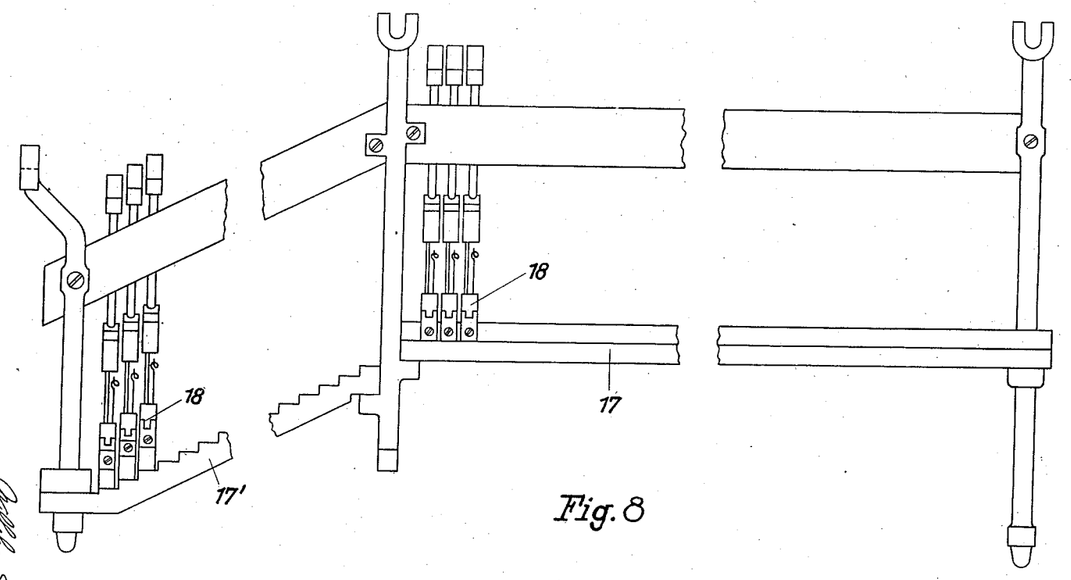
Fig. 8 is a plan-view of the oblique action bar, shaped in the form of steps, with the action elements vertically screwed thereon.

The tuning bar 16 which is arranged behind the sounding board 9 is continued up to the outer contour of the instrument. Hereby I attain that a sounding board of the same size can be placed as in a normal instrument. Furthermore it then becomes possible to give the ribs arranged at the rear side of the sounding board 9, especially in the middle position, the same length as in a normal instrument or even a greater length. The angular action bar 17 is, as shown in Fig. 8 on its broken portion 17' made in the form of steps, and the different elements 18 of the action are vertically attached to, preferably screwed on this bar 17, 17'. This affords, in connection with the displacement of the strings, the advantage that now the touching line which is exactly determined by well-known physical laws (the touching point is positioned at about one eighth of the whole length of the string) can be positioned at the point required by the corresponding lengths of the sounding strings.

As seen from Figs. 9 to 13, in the new miniature upright piano especially one-armed keys 19 are used. The upper part of the action, especially the hammers 20, lies above the hand-touched surface of the keyboard 5 and the lower part of the action lies below the keyboard 5. The power is transmitted to the hammers either by pressing members or by drawing members exclusively or by pressing and drawing members. Hereby an essential advantage over the hitherto known miniature pianos is obtained, viz., a normal position of the keys (playing level) independent of the formation and disposition of the acoustic elements of the instrument, for instance, of the length of the sounding strings and the height of the sounding board.

Figure 9:
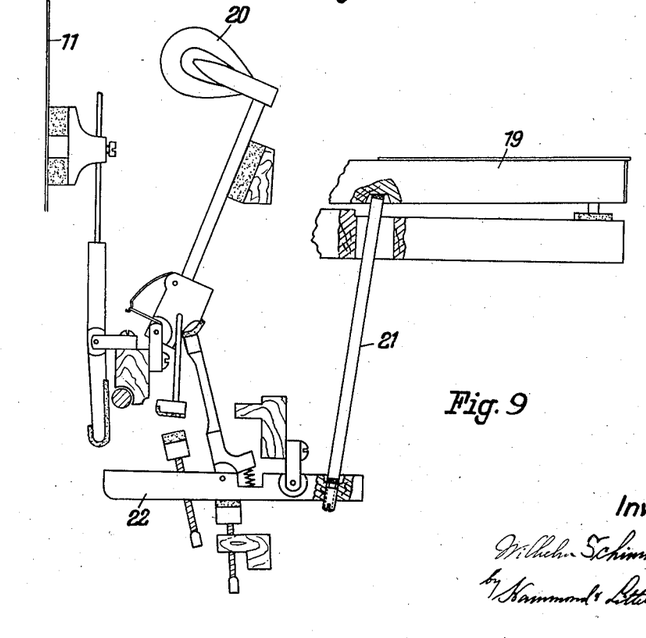
Figs. 9 to 13 are detail views showing the arrangement and the performance of different elements of the action.

In the action shown in Fig. 9 the force is transmitted from the key lever 19 to the hammer exclusively by pressing members, i. e., by a pressing bar and a double-armed lever 22. The other parts of the action are formed by well-known elements.

Figure 10:
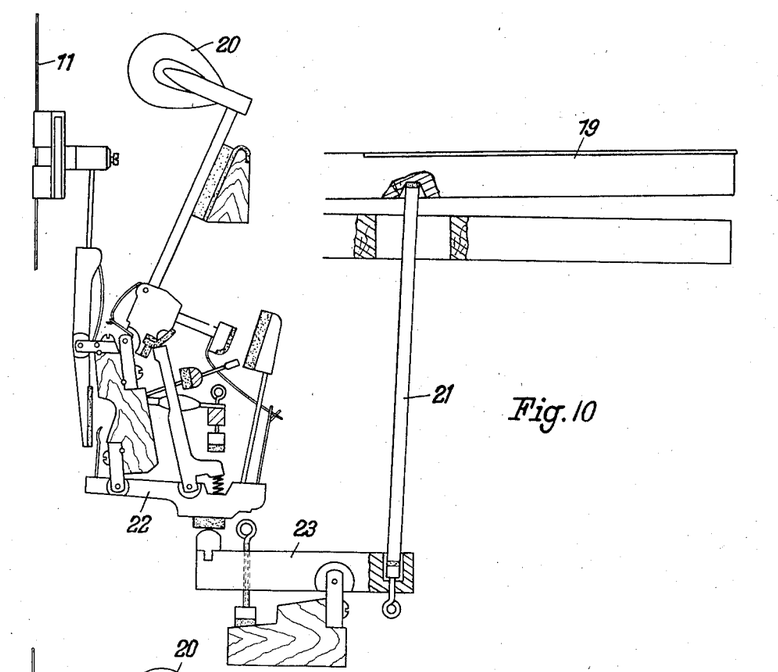

In the action shown in Fig. 10 the force is transmitted to the hammer 20 likewise, over one-armed key levers 19, exclusively by pressing members, viz., by a pressing bar 21, a firmly supported double-armed lever 23 being inserted which in turn actuates the lever 22 and therewith the other parts of the action.

Figure 11:
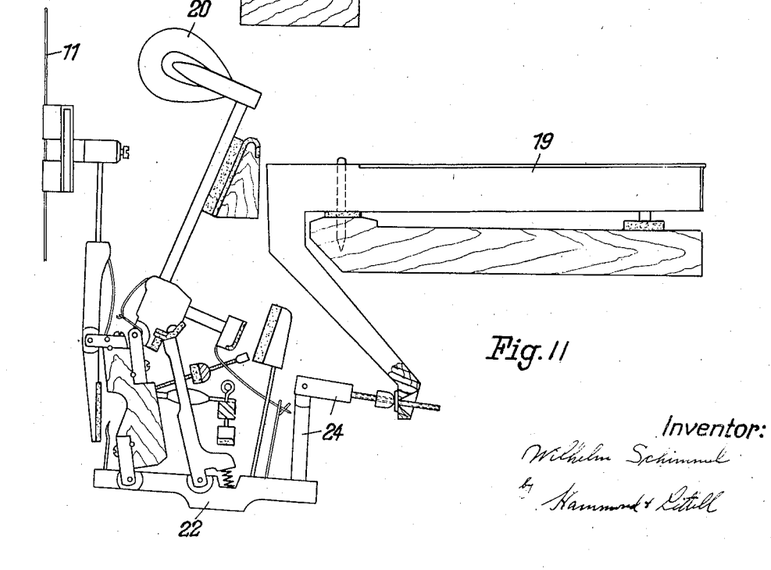

In the action shown in Fig. 11 the one-armed key is shaped to form an angular lever 19 and actuates, over an articulated intermediate member 24 (having, for instance, the form of a well-known swivel-box), a lever 22 and from here, in the well-known manner, the hammer 20.

Figure 12:
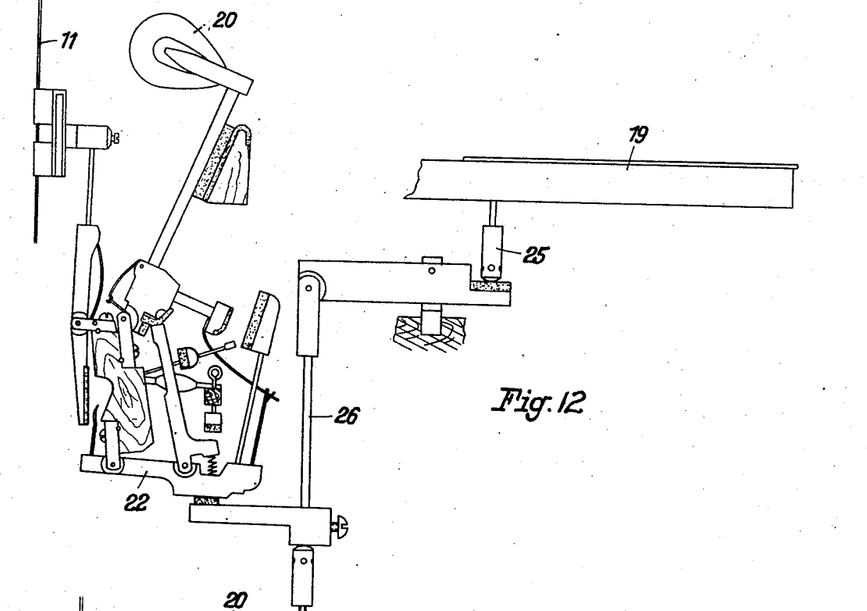
Figure 13:
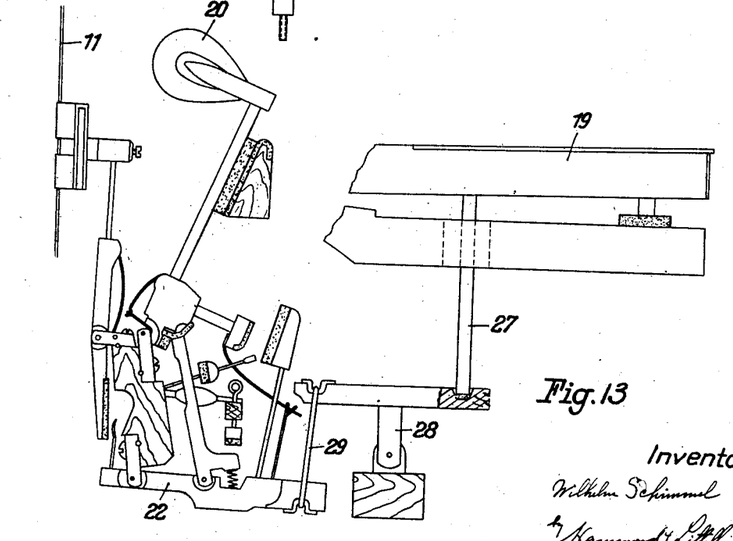

Fig. 12 shows an action for a miniature piano in which the force exerted on the one-armed key levers 19 is transmitted by pressing members 25 and drawing members 26 over the further well-known elements to the hammers 20.

Figure 14:
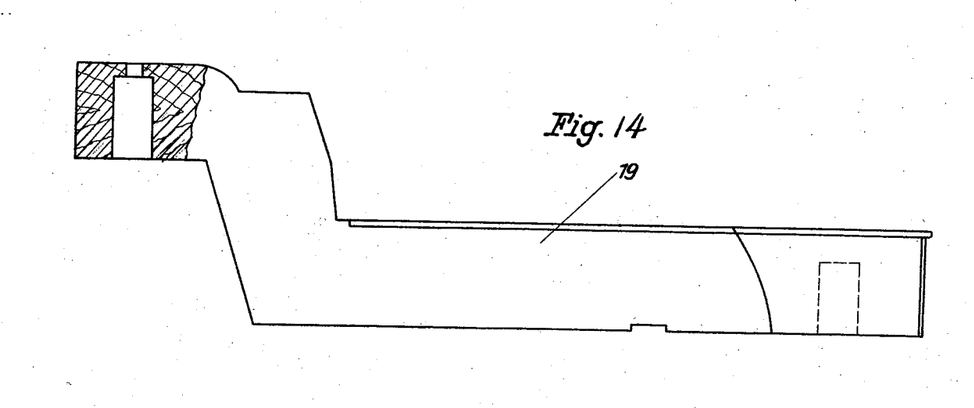
Fig. 14 shows in side-elevation, partly in cross-section, a key bent in a zigzag line at its rear end.

In the action shown in Fig. 14 the motion of the one-armed key lever 19 is transmitted by a pressing member 27 with the insertion of a firmly supported double lever 28 over the drawing member 29 and the double lever 22 to the hammer 20.

The one-armed key levers 19 are, as seen from Fig. 14, at their rear ends bent upwards. Hereby likewise a further and additional possibility is afforded to improve the position of the keyboard and to obtain a normal playing level.

Figure 16:
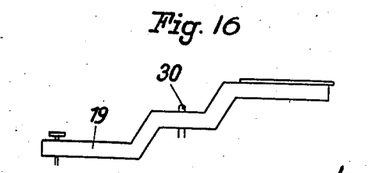
Fig. 16 is a side-elevation showing a key bent at both ends in a zigzag line.
Figure 18:
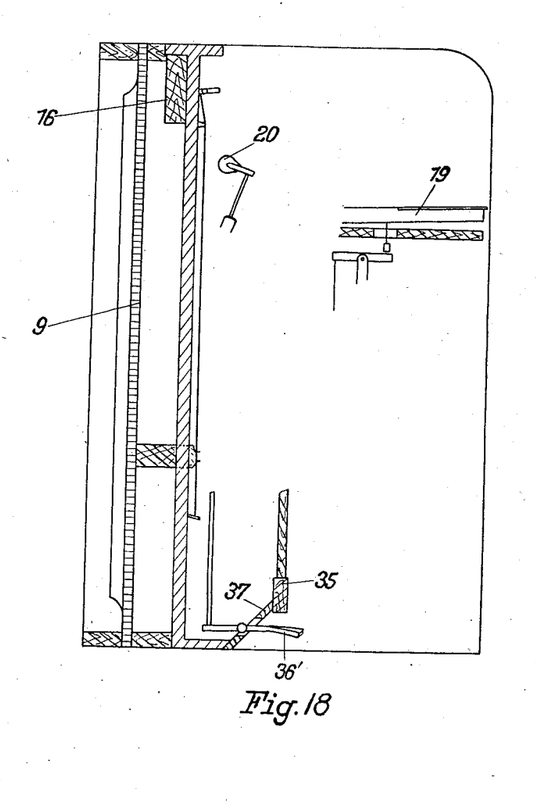
Fig. 18 is a side-elevation showing in cross-section the disposition of the sounding-board in the new miniature upright piano.

Another possibility illustrated in Fig. 16 consists in bending the one-armed keys with respect to their fulcrums 36 downwards at their rear ends and upwards at their front ends. This formation of the key 19 is based upon the usual height of the keys of about one inch. Hereby likewise a normal level of the keyboard in miniature pianos is obtained, and at the same time, whilst maintaining the low structure of a miniature piano, a normally formed action may be mounted in the instrument.

Figures 15, 17:
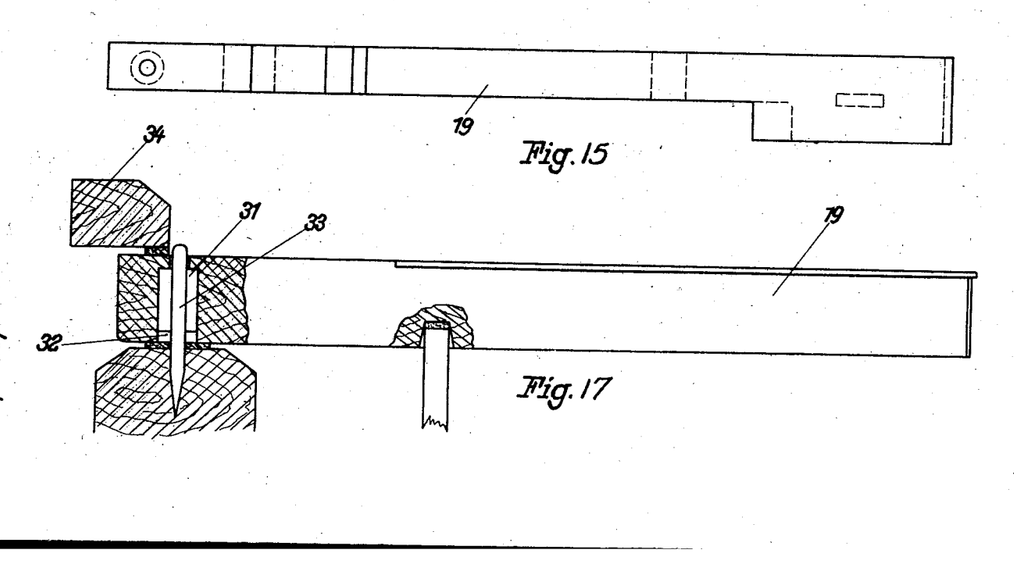
Fig. 15 shows the same key in plan-view.
Fig. 17 shows, in side-elevation and partly in cross-section, a new method of supporting the keys.

As shown by Fig. 17, the keys are further formed in such a manner that the key bottoms 31, which hitherto were positioned at the underside of the key, are displaced to the upper edge of the keys, and the guide blocks 32, which hitherto were disposed in the upper edges of the keys, are placed at the lower edge of the keys. The keys 19 further rotate at their upper sides about the scale-beam pin 33 and are checked at the top by a pressure-receiving bar 34. This displacement of the fulcrums of the keys is very important in view of an easy play on miniature pianos provided with half keys. We know that the half keys are held at the top by a pressure-receiving bar 34; now owing to the improved form of the keys no more friction takes place at the point where the felt of the pressure-receiving bar is disposed. In the known construction just the considerable friction occurring at this point prevents an easy return, i. e., rising of the keys. For this reason it was hitherto necessary to provide the members of the action with relatively heavy lead weights in order to enable the keys to rise. This always resulted in a difficult play, as in pressing the keys down the heavy lead weights had to be lifted. All these drawbacks are now avoided.

Figure 19:
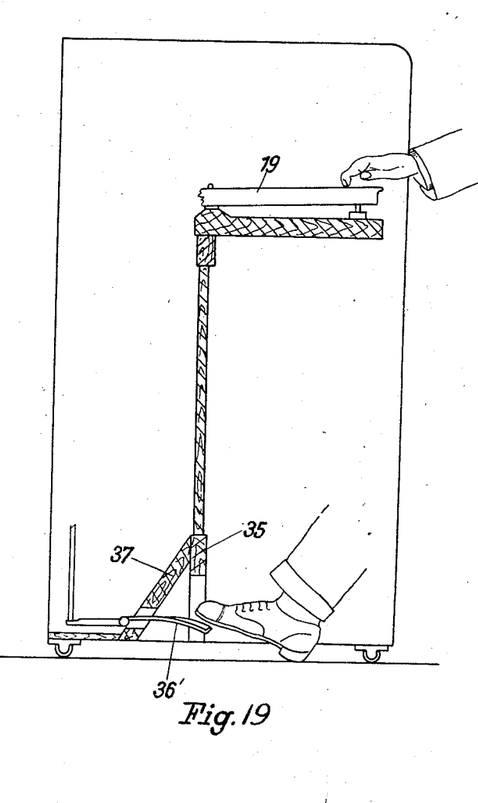
Fig. 19 is a side-elevation, partly a cross-section showing the arrangement of the pedals in the new miniature upright piano.

A further improvement consists therein that the front portion 35 of the base in the miniature piano has been raised and the bottom 37 of the base rearwards inclined. The pedals 36' have been pushed back and rest below the front portion 35 whereby a convenient position of the pedals as in a normal grand piano and a normal seat of the player before the new miniature upright piano are obtained.

I claim:

A miniature upright piano comprising, in combination, an upright casing, a vertical iron frame secured therein, two series of strings secured to the iron frame, one series extending in a generally vertical direction and having a substantially horizontal touching line, the other series extending generally diagonally and substantially from one corner to the diagonally opposite corner of the casing at substantially a right angle to the strings of the first series and having a touching line extending in a straight line diagonally of said frame, a horizontal series of keys, a two section action bar extending in a vertical plane within the casing, one section extending horizontally and generally parallel to the touching line of the first series of strings, the second section being stepped and extending generally parallel to the touching line of the second series of strings and at a considerable angle to the first section, a series of hammers positioned to engage the strings along the two touching lines and action units therefor pivoted on said action bar, and a series of rods of different lengths connecting the piano keys to said action elements.

WILHELM SCHIMMEL.